T. M. RIGHTER.
Rope-Sheave.

No. 214,454.    Patented April 15, 1879.

WITNESSES:
A. Schehl.
C. Sedgwick.

INVENTOR:
T. M. Righter
BY Munn & Co.
ATTORNEYS.

UNITED STATES PATENT OFFICE.

THOMAS M. RIGHTER, OF SANDY RUN, PENNSYLVANIA.

IMPROVEMENT IN ROPE-SHEAVES.

Specification forming part of Letters Patent No. 214,454, dated April 15, 1879; application filed February 25, 1879.

*To all whom it may concern:*

Be it known that I, THOMAS M. RIGHTER, of Sandy Run, in the county of Luzerne and State of Pennsylvania, have invented a new and useful Improvement in Rope-Sheaves, of which the following is a specification.

Figure 1:
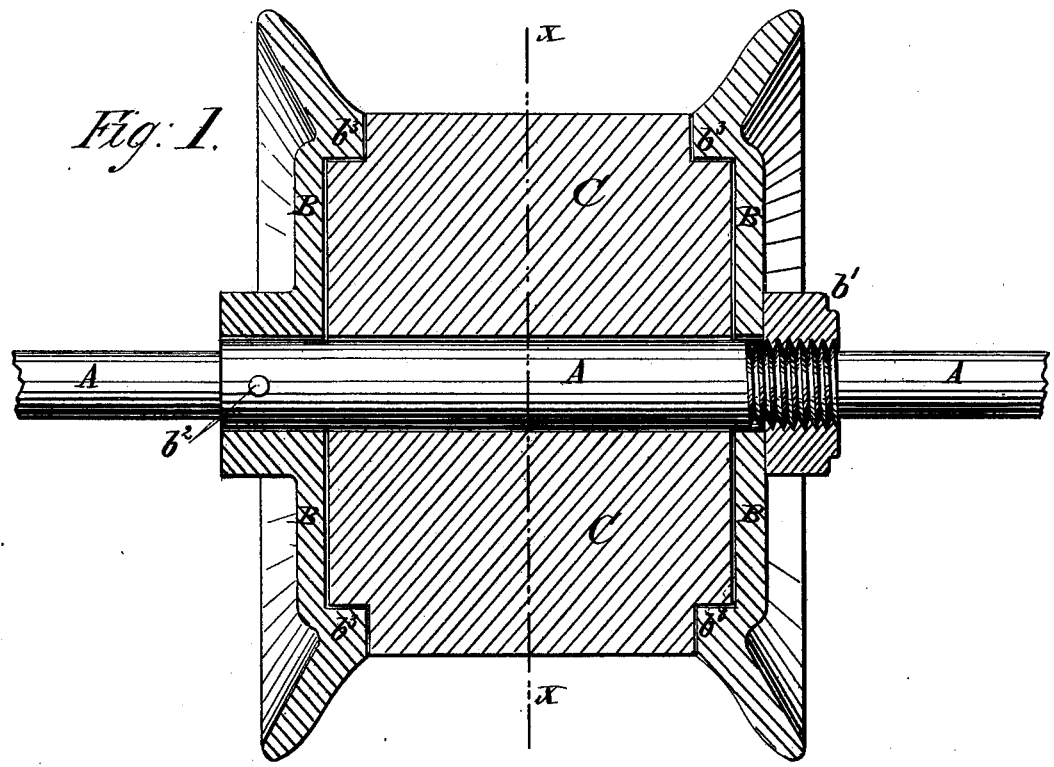
Figure 2:
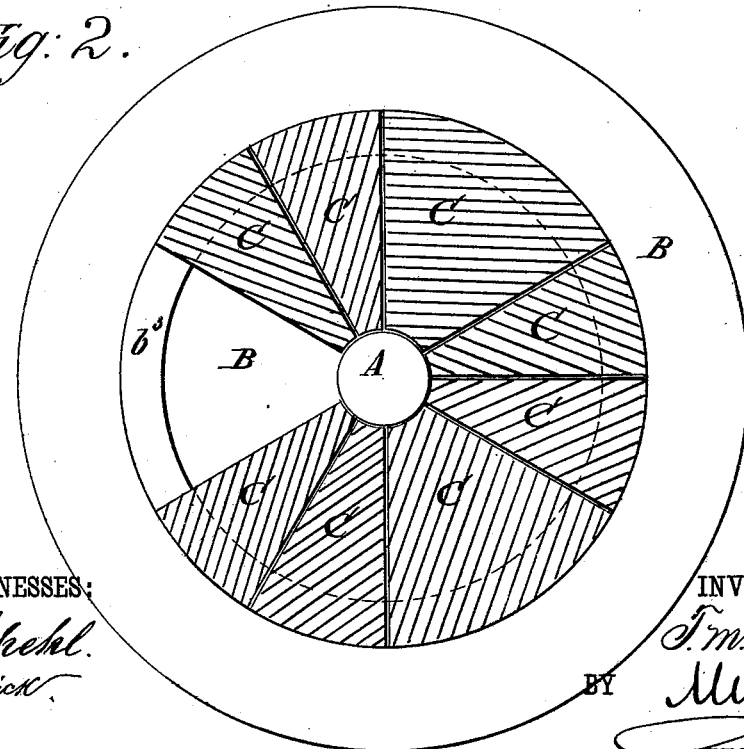

Figure 1 is a detail section of one of my improved rope-sheaves, taken longitudinally with its shaft. Fig. 2 is a cross-section of the same, taken through the line $x\ x$, Fig. 1.

Similar letters of reference indicate corresponding parts.

The object of this invention is to furnish improved sheaves designed especially for wire ropes or cables which shall be less expensive in manufacture and more durable in use than sheaves constructed in the usual way, which will allow the rope or cable to wear the wooden blocks entirely through before coming in contact with metal, which will hold the wooden blocks securely, and which may be tightened should the blocks become loose from skrinkage.

The invention consists in a rope-sheave formed by the combination of the flanges made with ribs or shoulders upon their inner sides at the bases of the bevel of their edges, the wedge-shaped wooden blocks made with the grain of the wood outward or radial, and with their outer edges rabbeted, and the nut or nuts with each other and with the shaft, having a screw thread or threads cut upon it, as hereinafter fully described.

A represents the shaft of the sheave, upon which are placed two disks or flanges, B, which are secured in place by nuts $b^1$, screwed upon screw-threads cut upon the shaft A; or one of the flanges B may be cast with a hub, and may be secured in place by a pin, $b^2$, passed through the said hub and through the shaft A.

When both of the flanges are secured by nuts, one of the said nuts may be locked in place by a pin, $b^2$, passed through it and through the shaft A. The edges of the flanges B are flared outward or are beveled upon their inner sides, and project beyond the wooden blocks C, to guide the rope or cable to and keep it upon the said wooden blocks C.

Upon the inner sides of the flanges B, at the base of their bevels, are formed shoulders or ribs $b^3$, which fit into rabbets in the outer edges of the wooden blocks C, to hold the said blocks in place and prevent them from flying off.

The blocks C are made wedge-shaped, with the grain of the wood outward or radial, so that the wear will come upon the ends of the grain.

With this construction, should the blocks C become loose by the shrinkage of the wood, they may be tightened by screwing up the nut or nuts $b^1$. The ends or journals of the shaft A are turned down to the bottoms or bases of the screw-threads cut upon them to receive the nuts $b^1$.

Having thus described my invention, I claim as new and desire to secure by Letters Patent—

A rope-sheave formed by the combination of the flanges B, made with ribs or shoulders $b^3$ upon their inner sides at the bases of the bevel of their edges, the wedge-shaped wooden blocks C, made with the grain of the wood outward or radial, and with their outer edges rabbeted, and the nut or nuts $b^1$, with each other and with the shaft A, having a screw thread or threads cut upon it, substantially as herein shown and described.

THOMAS McNAIR RIGHTER.

Witnesses:
E. A. KLINGER,
PARKER PRICE.